(12) United States Patent
Janasek et al.

(10) Patent No.: US 9,428,049 B2
(45) Date of Patent: Aug. 30, 2016

(54) MULTI-MODE POWER TRAINS WITH DIRECT-DRIVE LOCK-UP

(71) Applicant: DEERE & COMPANY, Moline, IL (US)

(72) Inventors: Clayton G. Janasek, Independence, KS (US); William E. Reeves, Coffeyville, KS (US)

(73) Assignee: Deere & Company, Moline, IL (US)

(*) Notice: Subject to any disclaimer, the term of this patent is extended or adjusted under 35 U.S.C. 154(b) by 117 days.

(21) Appl. No.: 14/191,207

(22) Filed: Feb. 26, 2014

(65) Prior Publication Data

US 2015/0239343 A1    Aug. 27, 2015

(51) Int. Cl.
| | |
|---|---|
| *F16H 37/06* | (2006.01) |
| *B60K 17/02* | (2006.01) |
| *B60K 6/00* | (2006.01) |
| *B60K 6/38* | (2007.10) |
| *F01B 21/00* | (2006.01) |
| *B60K 6/12* | (2006.01) |
| *B60K 6/48* | (2007.10) |

(52) U.S. Cl.
CPC ............... *B60K 17/02* (2013.01); *B60K 6/00* (2013.01); *B60K 6/12* (2013.01); *B60K 6/38* (2013.01); *B60K 6/48* (2013.01); *F01B 21/00* (2013.01); *B60W 2300/152* (2013.01); *Y10S 903/912* (2013.01); *Y10T 74/19014* (2015.01)

(58) Field of Classification Search
CPC . B60K 6/48; B60K 2006/4825; F16H 3/089; F16H 59/02
USPC .................................... 74/661, 665 A, 665 D
See application file for complete search history.

(56) References Cited

U.S. PATENT DOCUMENTS

| | | | |
|---|---|---|---|
| 3,427,899 A | 2/1969 | Gunderson et al. | |
| 4,951,466 A * | 8/1990 | Macht ..................... | F16H 48/18 60/329 |
| 5,186,692 A * | 2/1993 | Gleasman ............... | F16H 47/04 475/340 |
| 5,508,574 A | 4/1996 | Vlock | |
| 6,480,767 B2 | 11/2002 | Yamaguchi et al. | |

(Continued)

FOREIGN PATENT DOCUMENTS

| | | |
|---|---|---|
| EP | 0552140 A1 | 7/1993 |
| FR | 2970908 A1 | 8/2012 |

OTHER PUBLICATIONS

German Patent and Trademark Office, German Search Report for Application No. 10 2015 202 419.9 dated Jul. 10, 2015.

*Primary Examiner* — Ha D Ho
(74) *Attorney, Agent, or Firm* — Ingrassia, Fisher & Lorenz, P.C.

(57) ABSTRACT

A multi-mode power train and multi-mode vehicle include a A power-conversion device that is in communication with an engine via a direct mechanical power-transfer connection extending from the engine to the power-conversion device. A continuously variable power source (CVP) is in communication with the power conversion device via an intermediate power-transfer connection. A lock-up device with first and second engagement states is provided between the engine and the power-conversion device or the CVP. With the lock-up device in the first engagement state, mechanical power from the engine is converted by the power-conversion device for use by the CVP, with the CVP using the converted power to provide mechanical power to a power-output connection. With the lock-up device in the second engagement state, the engine transmits mechanical power through the lock-up device to the power-output connection.

10 Claims, 6 Drawing Sheets

(56) References Cited

U.S. PATENT DOCUMENTS

| | | |
|---|---|---|
| 7,465,251 B2 | 12/2008 | Zhang |
| 7,597,172 B1 | 10/2009 | Kovach et al. |
| 7,833,119 B2 | 11/2010 | Klemen et al. |
| 7,841,433 B2 | 11/2010 | Soliman et al. |
| 7,867,124 B2 | 1/2011 | Conlon et al. |
| 8,091,662 B2 | 1/2012 | Tolksdorf |
| 8,667,865 B2 | 3/2014 | Hoyle et al. |
| 8,840,524 B2 * | 9/2014 | Arsenault ............. B60W 10/06 477/5 |
| 2006/0196710 A2 * | 9/2006 | Banginski ............. B60K 6/442 180/65.225 |
| 2010/0307881 A1 | 12/2010 | Detrick et al. |
| 2011/0094809 A1 | 4/2011 | Poschmann et al. |

\* cited by examiner

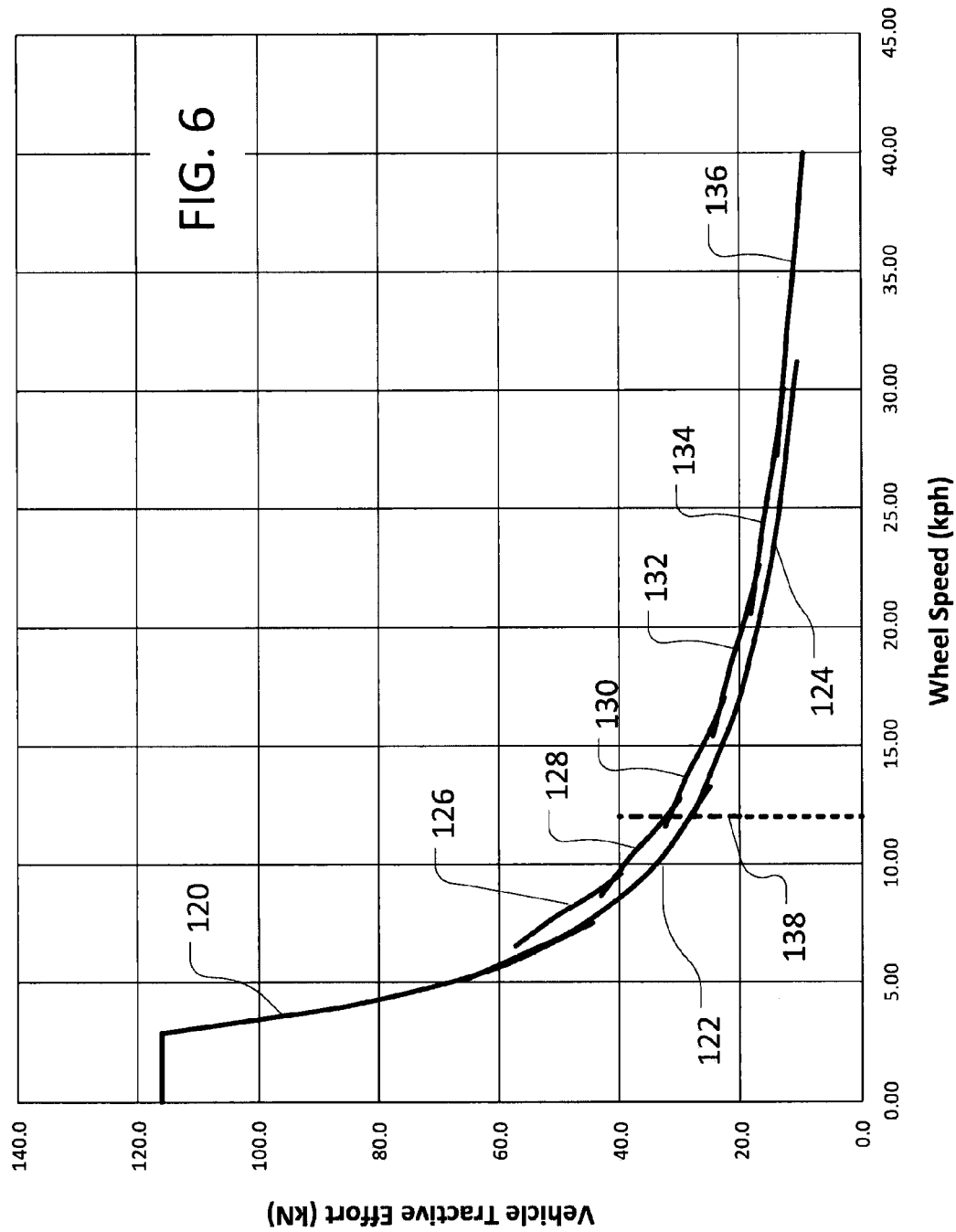

MULTI-MODE POWER TRAINS WITH DIRECT-DRIVE LOCK-UP

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to transmissions, including transmissions for operation of work vehicles in different powered modes.

BACKGROUND OF THE DISCLOSURE

It may be useful, in a variety of settings, to utilize both a traditional engine (e.g., an internal combustion engine) and an continuously variable power source (e.g., an electric or hydrostatic motor) to provide useful power. For example, in a vehicle or other powered platform having both an engine and a continuously variable power source, a portion of the engine power may be diverted to drive a power-conversion device (e.g., a hydraulic pump or an electric machine acting as a generator), which may in turn drive the continuously variable power source (e.g., a hydraulic motor or another electric machine acting as a motor). The output of the continuously variable power source may then be utilized to execute useful operations (e.g., to drive a vehicle or operate machinery associated with the vehicle).

In certain applications, a vehicle or other platform may be configured to operate in various different powered modes. For example, a vehicle may be configured to operate in a direct-drive mode, in which power is utilized from the engine only, as well as in other modes in which a continuously variable power source (e.g., an electric or hydraulic motor, which may be powered, indirectly, by the engine) is utilized to varying degrees.

SUMMARY OF THE DISCLOSURE

A multi-mode power train and multi-mode vehicle are disclosed. According to one aspect of the disclosure, a power-conversion device may be in communication with an engine via a direct mechanical power-transfer connection extending from the engine to the power-conversion device. A continuously variable power source ("CVP") may be in communication with the power conversion device via an intermediate power-transfer connection. A lock-up device with first and second engagement states may be provided between the engine and the power-conversion device or the CVP. With the lock-up device in the first engagement state, mechanical power from the engine may be converted by the power-conversion device for use by the CVP, with the CVP thereby providing mechanical power to a power-output connection. With the lock-up device in the second engagement state, the engine may transmit mechanical power through the lock-up device to the power-output connection.

In certain embodiments, the power-conversion device may include a hydraulic pump or an electric generator and the CVP may include, respectively, a hydraulic motor or an electric motor.

In certain embodiments, the engine, the power-conversion device, the lock-up device and the CVP may be arranged in series, with respect to the path of power transmission. The lock-up device may include a clutch device between the power-conversion device and the CVP, the clutch device being integrated with a rotor of the CVP.

In certain embodiments, the lock-up device may include a clutch assembly and a gear. With the lock-up device in the first engagement state or the second engagement state, the CVP or the engine, respectively, may transmit power to the power-output connection via the clutch assembly and the gear.

In certain embodiments, the lock-up device may include a first clutch device and a first gear, with a second clutch device and a second gear being included between the CVP and the power-output connection. With the lock-up device in the first engagement state and the second clutch engaging the second gear, the CVP may transmit mechanical power to the power-output connection via the second clutch and the second gear. With the lock-up device in the second engagement state, the engine may transmit mechanical power to the power-output connection via the first clutch device and the first gear.

In certain embodiments, an energy storage device may in communication with the CVP and the power-conversion device. In a first mode, the energy storage device may receive energy for storage from at least one of the power-conversion device and the CVP. In a second mode, the energy storage device may provide stored energy from the energy storage device to the CVP.

The details of one or more implementations are set forth in the accompanying drawings and the description below. Other features and advantages will become apparent from the description, the drawings, and the claims.

BRIEF DESCRIPTION OF THE DRAWINGS

FIG. 6 is a graphical representation of example vehicle tractive effort and vehicle wheel speeds for various modes of operation of the multi-mode power train of FIG. 5.

Like reference symbols in the various drawings indicate like elements.

DETAILED DESCRIPTION

Figure 1:
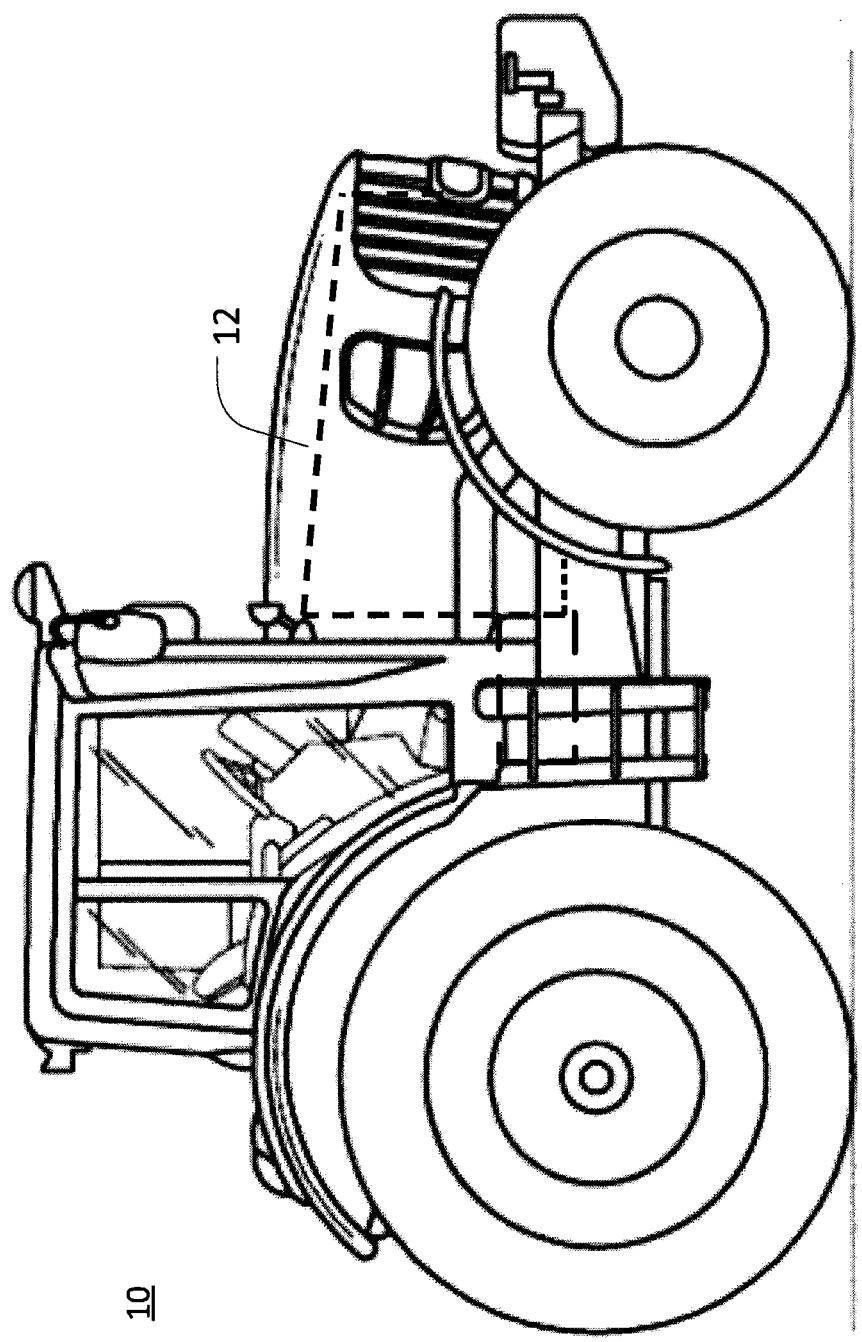
FIG. 1 is a side view of an example vehicle with a multi-mode power train.

The following describes one or more example embodiments of the disclosed multi-mode power trains, as shown in the accompanying figures of the drawings described briefly above. Various modifications to the example embodiments may be contemplated by one of skill in the art.

As noted above, in work vehicles or other platforms, a portion of mechanical power from an engine (including, potentially, all of the engine power) may sometimes be converted to another form in order to drive a continuously variable power source ("CVP"). For example, an engine may be utilized to drive an electric generator or a hydraulic pump, with the resulting electrical or hydraulic power being utilized, respectively, to drive an associated electric or hydraulic motor.

In this light, it will be understood that a vehicle (or other platform) may sometimes be capable of operation in a variety of powered modes. For example, in a direct-drive or purely mechanical mode, mechanical power may be directly transmitted from the engine to a power-output connection (e.g., a transmission output shaft, differential drive shaft, power take-off shaft, and so on). In contrast, in a different mode (or modes), the same (or a different) power-output connection may alternatively (or additionally) receive mechanical power from the CVP. For example, in a purely electric (or hydraulic) mode, all of the mechanical power from the engine may be routed for conversion to electrical (or hydraulic) power in order to drive an electric (or hydraulic) motor. The motor may then act as a sole power source for operation of the vehicle (or various vehicle components). Despite the inherent efficiency losses in the conversion of engine power for the CVP in such a latter mode (or modes), the characteristics of electric or hydraulic motors (or other CVPs) may provide for improved performance of a vehicle (or other platform) during certain operations. Accordingly, in certain settings, it may be useful to provide a system that allows for efficient transition between direct-drive and other modes (e.g., purely electric or purely hydraulic modes).

In certain embodiments, for example, an engine (e.g., an internal combustion engine) may provide mechanical power to a power train. The power train may also include a power-conversion device, such as an electric generator or a hydraulic pump, and an associated CVP, such as an electric or hydraulic motor. The engine may provide mechanical power to the power-conversion device, which may convert the received power to a form that may be used by the CVP (e.g., electricity for an electric motor, or hydraulic pressure or flow for a hydraulic motor). In certain embodiments, the engine may provide mechanical power to the power-conversion device over a direct mechanical power-transfer connection that extends from the power source to the power-conversion device. For example, the engine may provide mechanical power to the power-conversion device over various mechanical shafts and gears, without the use of a torque converter or other fluid coupling. (As used herein, "direct mechanical" power transmission may include transmission of mechanical power by direct physical connection, through various integrally formed parts, or via various intervening mechanical elements such as a gear set to modify rotational speeds. In contrast, for example, power transmission using a torque converter or other fluid coupling may not be considered a "direct mechanical" transmission.)

Continuing, a lock-up device may be provided as part of the power train, in order to allow for transition between direct-drive and other powered modes (e.g., purely electric or hydraulic modes). A lock-up device may be configured in various ways, and may be located in various places within the power train. In certain embodiments, a lock-up device may include a clutch device (or similar mechanism) located between the engine and either of the power-conversion device or the CVP. (As used herein, "between" may refer to a location with respect to a flow of power, rather than an actual physical location. As such, for example, a clutch device may be viewed as located "between" an engine and a power-conversion device if power is routed, at least in part, from the engine through the clutch device in order to reach the power-conversion device.)

In certain embodiments, when a clutch device (or another lock-up device) is in a first engagement state, it may provide a direct-drive (i.e., direct mechanical) connection between the engine and various downstream components of the power train. In this way, for example, the clutch device may allow for direct mechanical transmission of power from the engine to a downstream power-output connection (e.g., an output shaft of a power-shift transmission, a differential drive shaft, a power take-off shaft, and so on), and, correspondingly, for direct-drive operation of the vehicle.

Continuing, when the clutch device (or another lock-up device) is in a second engagement state, the direct mechanical connection between the engine and the power-output connection may be may severed, and an alternative path provided for power transmission between the CVP and the power-output connection. In this way, through the transition of the clutch device (or other lock-up device) between different engagement states, a power train may be transitioned between a direct-drive mode (i.e., a mode in which power is provided to an output connection solely from the engine) and a CVP mode (i.e., a mode in which power is provided to the output connection solely from the CVP). (It will be understood that even in the CVP mode, the engine may still provide power to the output connection indirectly, as the engine may continue to provide power, via the power-conversion device, to drive the CVP.)

Among other benefits, such a multi-mode power train may usefully allow for a combination of control and efficiency, without the need for a torque converter or other fluid coupling between the engine and various other components of the power train. For example, it will be understood that a torque-converter (or other similar mechanisms) may provide for relatively effective torque control (e.g., via actuation of a throttle pedal). However, it will also be understood that a torque-converter may lead to relative low system efficiency, particularly at high-load/low-speed applications. For example, in a vehicle applying large draw-bar force with low or zero wheel speed (e.g., when a heavily-loaded vehicle is starting from a stop or otherwise trying to shift a heavy, stationary load), large amounts of energy may be wasted by thermal/fluidic dissipation within a torque-converter. In contrast, a CVP (e.g., an electric motor) may provide relatively high, and relatively loss-free, torque at low wheel speeds. However, a CVP may introduce inefficiencies because of the need to convert mechanical power from an engine to a form compatible with the CVP (e.g., electrical power), so overall system efficiency may be increased by switching from CVP mode to direct-drive mode for certain operations. In this light, by providing for a system which may easily switch between a CVP mode (e.g., for operations at low vehicle speeds) and a direct-drive mechanical mode (e.g., for operations at higher vehicle speeds), high system efficiency and useful torque control may be attained without requiring the use of a torque converter (and the losses inherent thereto). Additionally, such a system may allow for optimization of an included CVP (and the power-conversion device) to a relatively narrow speed range (e.g., through selection of a high torque/low speed CVP), thereby allowing for potentially significant cost savings.

As will become apparent from the discussion herein, the disclosed power train configurations may be used advantageously in a variety of settings and with a variety of machinery. For example, referring now to FIG. 1, the disclosed system may be included in power train 12 of work vehicle 10. In FIG. 1, work vehicle 10 is depicted as a tractor. It will be understood, however, that other configurations may be possible, including configuration of work vehicle 10 as a different kind of tractor, an articulated dump truck, a front-end or back-hoe loader, a log skidder or other forestry equipment, a motor grader, or one of various other work vehicles. It will also be understood that the disclosed power train configurations may be used in various non-work vehicles and non-vehicle applications (e.g., fixed-location powered machinery).

Figure 2:
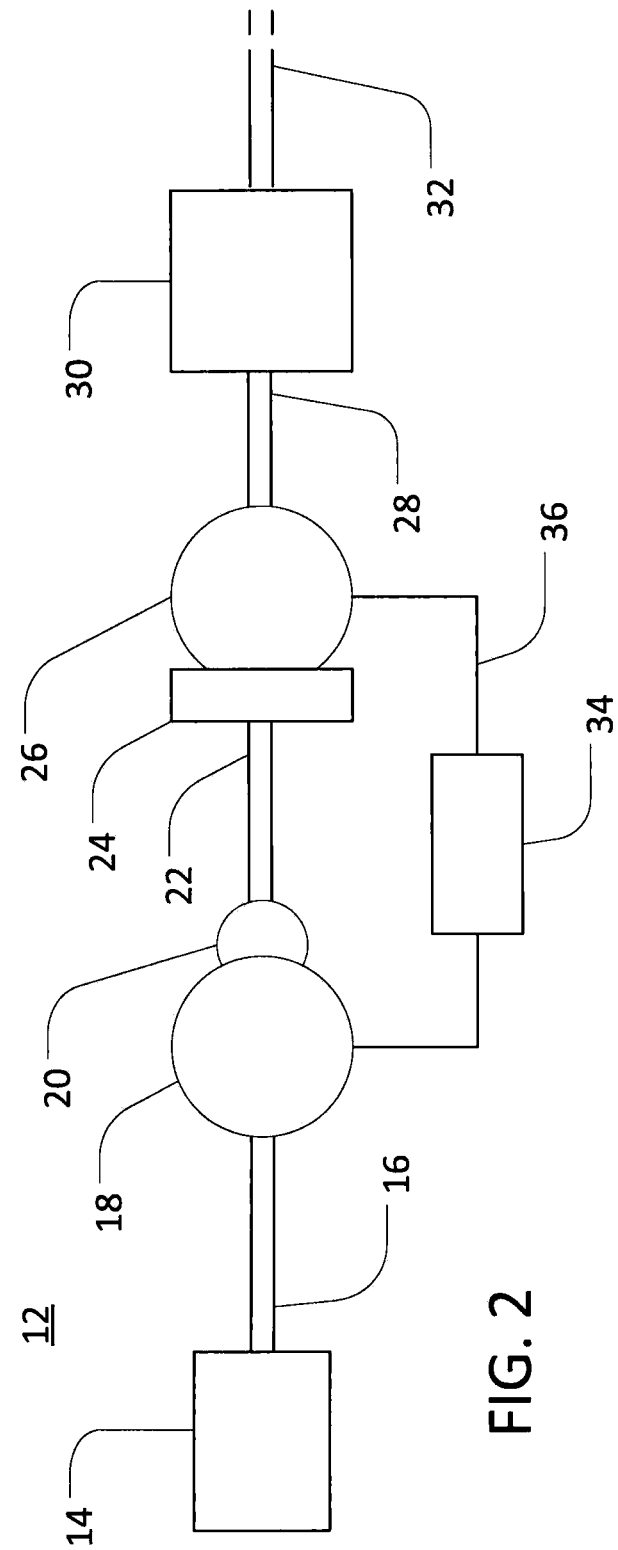
FIG. 2 is a schematic view of certain components included in an example multi-mode power train of the vehicle of FIG. 1.

Referring now to FIG. 2, an example configuration of multi-mode power train 12 is provided. As depicted in FIG. 2, various components of an example of power train 12 are arranged in series. It will be understood, however, that other configurations may be possible, and that certain components depicted (or not depicted) in FIG. 2 may not be (or may be) included in other embodiments. (As discussed above regarding the use of "between," "series" may be utilized herein with respect to a flow of power, rather than an actual physical location. As such, for example, various devices may be viewed as oriented "in series" if power is routed sequentially from one to another, rather than being routed simultaneously to a plurality of the devices.) Engine 14 may be connected by mechanical power-transfer connection 16 (e.g., a rotating shaft, various gears, and so on), but not by a torque converter or other fluid coupling, to power-conversion device 18 and, in certain embodiments, also to device 20 (e.g., a hydraulic charge pump). Power-conversion device 18 may convert the received mechanical power to an alternative form (e.g., electrical or hydraulic power) and may transmit the converted power over connection 36 to CVP 26 or energy storage device 34 (e.g., a battery assembly or hydraulic accumulator). In certain embodiments, mechanical power-transfer connection 22 may also be provided between power-conversion device 18 and CVP 26, with power-transfer connection 28 transmitting power from CVP 26 to power-output connection 32 (e.g., via transmission 30).

In order to control transition between various powered modes of power train 12, lock-up device 24 may also be provided. In certain embodiments, as depicted in FIG. 2, device 24 may be located between power-conversion device 18 and CVP 26. As with various other components depicted in FIG. 2, however, various other configurations may be possible. For example, a lock-up device (e.g., device 24) may alternatively (or additionally) be arranged between engine 14 and power-conversion device 18.

Figure 3:
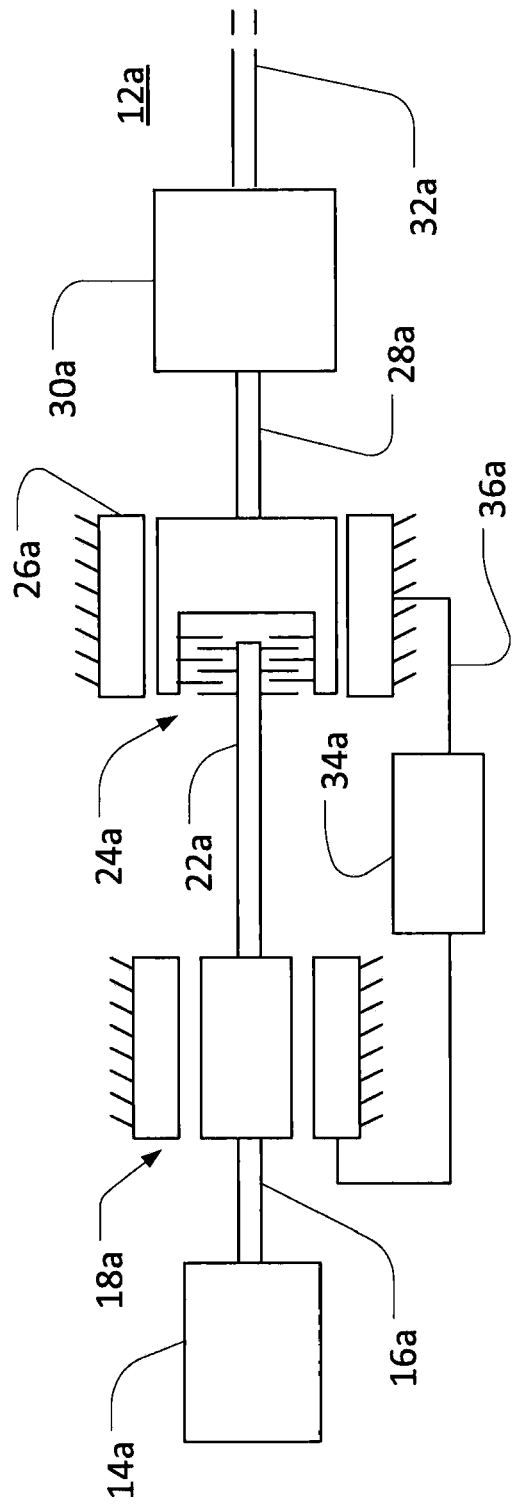
FIG. 3 is a schematic view of certain components included in another example multi-mode power train of the vehicle of FIG. 1.

Referring also to FIG. 3, an example configuration of series, electrical multi-mode power train 12a is provided. As depicted, for example, shaft 16a may extend from engine 14a to generator 18a, such that engine 14a may drive generation of electricity by generator 18a. Electric conduit 36a may be provided, which may carry electricity from generator 18a to battery assembly 34a and electric motor 26a. (As with various other configurations, various known control apparatuses may be included for control of such a power transmission. For example, various controllers and other power electronics (not shown) may be included to control the generation of electricity by generator 18a, storage and release of electrical energy by battery assembly 34a, powering of motor 26a via conduit 36a, and so on. Likewise, various actuators, controllers, and so on (not shown) may be provided for control of various components of a lock-up device.)

In certain embodiments, direct mechanical connection 22a (e.g., a rotating shaft or various shafts and mechanical gear sets) may be provided between engine 14a and generator 18a for transmission of mechanical power from engine 14a to generator 18a. Further, in certain embodiments, friction clutch 24a (or another lock-up device) may be provided between generator 18a and motor 26a. As depicted, for example, clutch 24a may be integrated with connection 22a and a rotor of motor 26a. In this way, when clutch 24a is engaged, a direct mechanical connection may be established between engine 14a and connection 28a (e.g., another rotating shaft), such that power may be provided directly from engine 14a to the remainder of the power train. Further, when clutch 24a is released, this direct mechanical connection may be severed, allowing downstream portions of the power train to be powered solely by motor 26a (e.g., as facilitated by electricity from generator 18a or battery assembly 34a). In this way, through actuation of clutch 24a (e.g., as controlled by a transmission control unit (not shown) or other known control devices or methods), power train 12a may be transitioned between direct-drive and electric-drive modes. For example, clutch 24a may be released to allow all-electric drive of vehicle 10 at low or zero speeds, then engaged to transition to direct-drive mode as desired. Further, in certain embodiments, motor 26a may be caused (e.g., via various known control systems (not shown)) to operate in a reversed direction to also allow all-electric drive of work vehicle 10 for rearward travel. This latter functionality, for example, may allow for elimination of a reversing gear in power train 12a (e.g., within power shift transmission 30a).

The configuration of FIG. 3 (and others) may additionally. (alternatively) allow for capture of power by motor 26a, or for provision of supplemental power by motor 26a. For example, in a coasting or braking operation, motor 26a may be operated as a generator in order to convert excess mechanical power to electrical energy for storage in battery assembly 34a. Similarly, if power train 12a is being operated in a direct-drive mode, motor 26a may be utilized selectively to provide a boost of additional power (e.g., by drawing power from battery assembly 26a).

Figure 4:
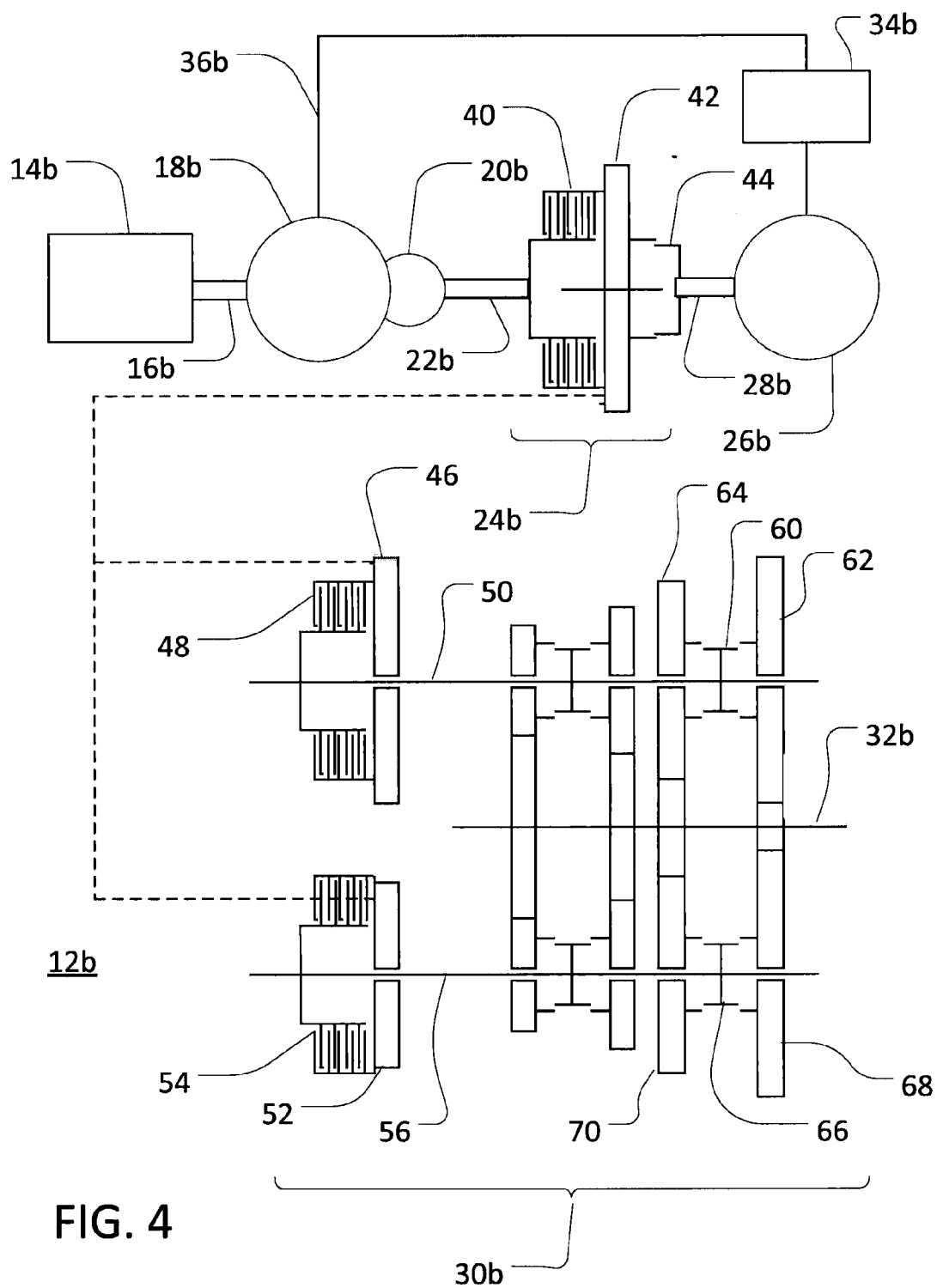
FIG. 4 is a schematic view of certain components included in yet another example multi-mode power train of the vehicle of FIG. 1.

It will be understood that other configurations may be possible, including other configurations with engine 14, power-conversion device 18, lock-up device 24, and CVP 26 arranged in series. Referring also to FIG. 4, for example, example power train 12b is depicted, with a series arrangement of engine 14b, and a hydraulic CVP. For example, mechanical connection 16b (e.g., a rotating shaft, or various shafts and gear sets) may allow for direct mechanical transmission of power from engine 14b to hydraulic pump 18b and, in certain embodiments, to charge pump 20b. Hydraulic line (or circuit) 36b may extend from pump 22b to hydraulic motor 26b (and, potentially, to hydraulic accumulator 34b), to facilitate generation of mechanical power by motor 26b. Power-transfer connection 22b (e.g., a rotating shaft) may also be provided, which may provide for mechanical transmission of power from engine 14b to lock-up device 24b. Likewise, connection 28b may provide for transmission of mechanical power from motor 26b to lock-up device 24b.

As depicted, lock-up device 24b may include friction clutch 40 linking connection 22b to gear 42, and collar clutch 44 (e.g., a dog-collar clutch) linking connection 28b to gear 42. Gear 42, in turn, may be meshed with input gears 46 and 52 of power shift transmission ("PST") 30b. (It will be understood, for this and other examples, that various other transmission types or configurations may additionally (or alternatively) be employed. Further, in certain embodiments, no PST or other transmission may be provided downstream of lock-up device 24.) Gears 46 and 52, respectively, may be linked via friction clutches 48 and 54 to gear shafts 50 and 56, which may include various selectable gears corresponding to various different gear ratios (e.g., gears 62 and 64, which may engage with two-way synchronizer clutch 60, and gears 68 and 70, which may engage with two-way synchronizer clutch 66). In certain embodiments, charge pump 20*b* may be configured to supply lubrication or cooling fluid to PST 30*b*, or other components of power train 14*b*, as well as to pump 18*b*.

In the configuration depicted in FIG. 4, power train 12*b* may be transitioned between direct-drive and CVP modes through selective activation of various clutches, and may execute various gear shifts within each such mode. For example, with clutch 40 engaged and clutch 44 disengaged, engine 14*b* may provide mechanical power to gear 42 via direct mechanical connection (i.e., connections 16*b* and 22*b*). Various combinations of clutches 48, 54, 60, 66, and so on, may then be engaged in order to provide a particular gear ratio between engine 14*b* and output shaft 32*b*. In contrast, with clutch 44 engaged and clutch 40 disengaged, the mechanical power-transmission connection between engine 14*b* and PST 30*b* may be severed, and a mechanical power-transmission connection established between PST 30*b* and motor 26*b*. In this way, with motor 26*b* operating as driven by pump 18*b* (or accumulator 34*b*), various combinations of clutches 48, 54, 60, 66, and so on, may be engaged in order to provide a particular gear ratio between motor 26*b* and output shaft 32*b*. In practice, for example, at low or zero speeds for work vehicle 10, clutch 44 may be engaged in order to provide for hydraulic-only drive of PST 30*b*. At a particular vehicle speed, clutch 44 may then be disengaged and clutch 40 engaged, in order to provide for efficient, direct-drive powered only by engine 14*b*. Further, in certain embodiments, motor 26*b* may be driven in a reversed direction, in order to allow for rearward travel of vehicle 10 in CVP mode.

Figure 5:
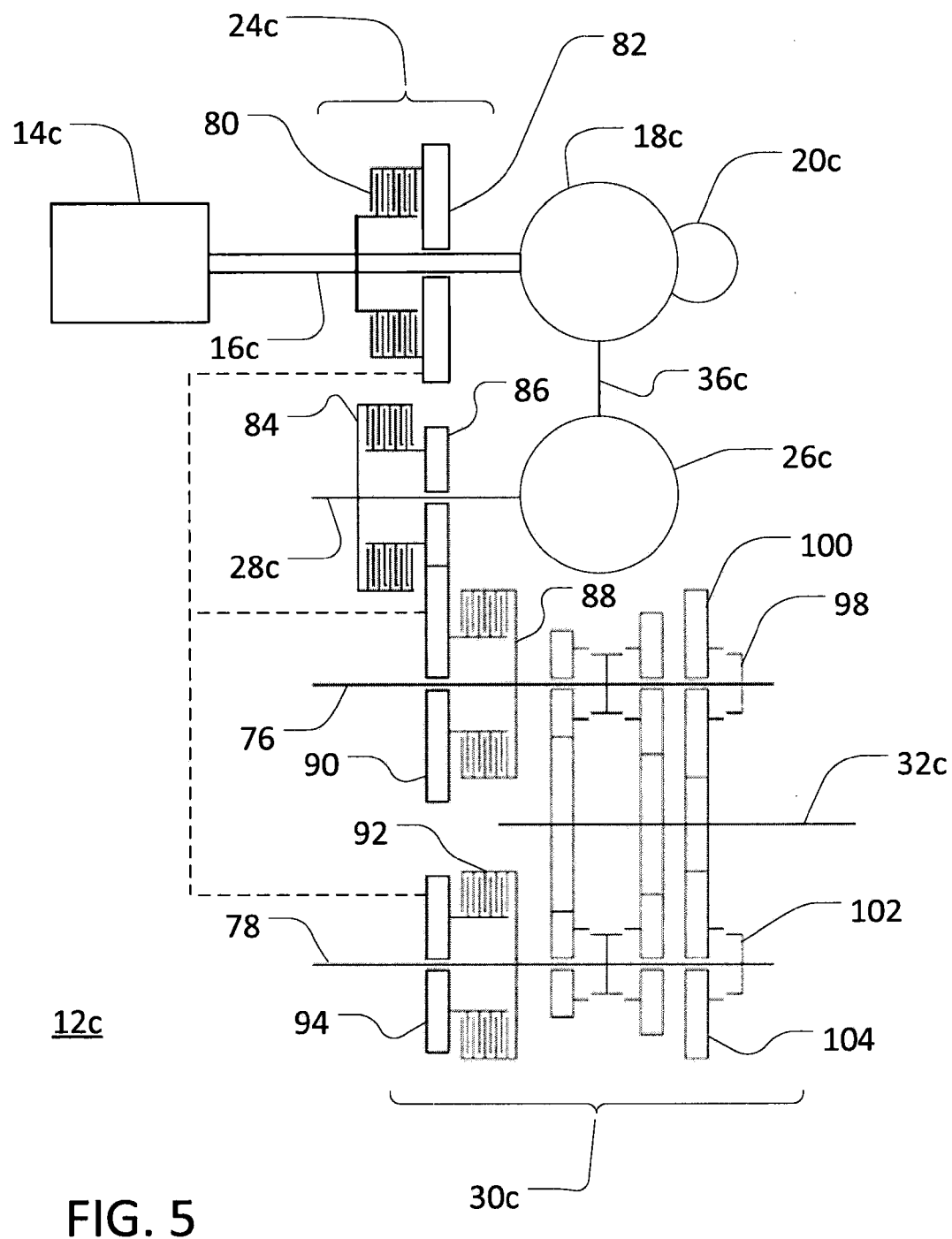
FIG. 5 is a schematic view of certain components included in still another example multi-mode power train of the vehicle of FIG. 1.

Various non-series arrangements may also be possible. Referring also to FIG. 5, for example, engine 14*c* may directly provide mechanical power to lock-up device 24*c*, hydraulic pump 18*c*, and charge pump 20*c* via connection 16*c* (e.g., a rotating shaft, or various shafts and gear sets). Lock-up device 24*c* may include friction clutch 80 linked to gear 82, which may be meshed with input gears 90 and 94 of PST 30*c*. Hydraulic connection 36*c* may provide hydraulic power from pump 18*c* to hydraulic motor 36*c*. Motor 36*c*, in turn, may provide mechanical output via connection 28*c* (e.g., a rotating shaft, or various shafts and gear sets) to friction clutch 84, which may be linked to gear 86. Gears 90 and 94, respectively, may be linked via friction clutches 88 and 92 to gear shafts 76 and 78, which may include various selectable gears (e.g., gear 100, configured to engage with synchronizer clutch 98, and gear 104, configured to engage with synchronizer clutch 102).

Accordingly, through selective activation of the various clutches, power train 12*c* may be transitioned between direct-drive and CVP modes, and may execute various gear shifts within each such mode. For example, with clutch 80 engaged and clutch 84 disengaged, engine 14*c* may provide power to gear 82 via a direct mechanical connection. Various combinations of clutches 88, 92, 98, 102, and so on, may then be engaged in order to provide a particular gear ratio between engine 14*c* and output shaft 32*c*. With clutch 84 engaged and clutch 80 disengaged, the mechanical power-transmission connection between engine 14*c* and PST 30*c* may be severed, and a mechanical power-transmission connection established between PST 30*c* and motor 26*c*. In this way, with motor 26*c* operating (e.g., in a forward or a reverse direction, driven by pump 18*c*), various combinations of clutches 88, 92, 98, 102, and so on, may be engaged in order to provide a particular gear ratio between motor 26*c* and output shaft 32*c*. In practice, for example, at low or zero speeds for vehicle 10, clutch 84 may be engaged in order to provide for hydraulic-only drive of PST 30*c*. At a particular vehicle speed, clutch 84 may then be disengaged and clutch 80 engaged, in order to provide for efficient, direct-drive powered only by engine 14*c*.

As depicted in FIG. 5 (and in contrast, for example, to FIG. 4), power train 12*c* may be configured such that motor 26*c* may provide power to output shaft 32*c* only via a subset of the total gear ratios provided by PST 30*c*. This may, for example, reduce system complexity, while still allowing for a wide range of output speeds at shaft 32*c* in CVP mode, due to the potentially large speed range of motor 26*c*. (It will be understood that similar configurations may also be utilized for other power trains 12 and CVPs 26.)

Referring also to FIG. 6, an example tractive-force to wheel-speed curve is provided with respect to a vehicle including power train 12*c* (assuming zero wheel slip). At zero and low vehicle speed, for example, power train 12*c* may operate in CVP mode, with hydraulic motor 26*c* providing all of the motive power for the vehicle. At a lowest gear of PST 30*c*, accordingly, motor 26*c* may allow operation of the vehicle along curve 120 (with similar operation in reverse (not shown) being possible for reverse-direction rotation of motor 26*c*). As the vehicle accelerates, shifts within PST 30*c* to other gear ratios may allow continued operation of the vehicle along curves 122 and 124, with the vehicle still being driven exclusively by motor 26*c*.

At a particular speed (e.g., 12 kph, as indicated by line 138), then, in order to increase the efficiency of vehicle operation, a transition may be made to direct-drive mode. For example, clutch 84 may be disengaged to sever the power-transfer connection between motor 26*c* and PST 30*c*, and clutch 80 may be engaged to provide a direct mechanical power-transfer connection between engine 14*c* and PST 30*c*. The vehicle may then operate along curves 126, 128, 130, 132, 134 and 136, which may represent, respectively, direct-drive operation in the six gear ratios provided by PST 30*c*. (It will be understood that the transition to (or from) direct-drive mode may occur at other speeds than 12 kph, for various operations, vehicles or power trains. Likewise, it will be understood that similar curves (not shown) may represent the various modes of operation of power trains 12*a* or 12*b*, or various other power trains (not shown) that utilize an engine, a lock-up device, and a CVP as generally discussed herein.)

It will be understood that various combinations and variations of aspects of the examples above may be employed in various alternative configurations without departing from the concepts of this disclosure. In various embodiments, for example, various configurations or combinations of gear ratios, PST types, CVP types, clutch device types (e.g., wet or dry friction clutches, dog collar clutches, or synchronizers), power-transfer connection types (e.g., various rotating shafts, or various geared connections with or without gear reductions), and so on, may be possible. In certain embodiments, for example, by implementing speed-matching algorithms for a CVP it may be possible to reduce costs and complexity by utilizing collar clutches, rather than friction clutches, with respect to power-transfer connections between a particular CVP 26 and various other power train components. Likewise, various configurations of PSTs 30 may be utilized without departing from the spirit of this disclosure, including eight-speed PSTs (e.g., PST 30*b*), six-speed PSTs (e.g., PST 30*c*) or other configurations, including, in certain embodiments, no PST. In certain embodiments, multiple power-output connections 36 may be provided (e.g., both a PTO connection and a differential drive shaft from a PST). Further, in certain embodiments and as also noted above, reverse drive powered by a CVP may be possible through the reverse-direction rotation of the CVP, while in other embodiments a particular reversing gear may be provided. Finally, depiction of a particular CVP (and related components) in an example configuration as being of a particular type (e.g., an electric motor or a hydraulic motor) is not intended to limit the disclosure to that particular type of CVP (and related components).

Continuing, although specific terms such as "generator" and "motor" (and the like) may be used herein to describe various example configurations, it will be understood that these (and similar) terms may be used to refer generally to an electrical machine that may be capable of operating either as a generator or as a motor. For example, electric generator 18a may sometimes operate as an electric motor, and electric motor 26a may sometimes operate as a generator. Likewise, it will be understood that the actual operating modes of other continuously variable power sources may similarly vary from those explicitly described herein.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that any use of the terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various other implementations are within the scope of the following claims.

What is claimed is:

1. A multi-mode power train for receiving and transmitting power from an engine, the multi-mode power train comprising:
    a power-conversion device in communication with the engine via a direct mechanical power-transfer connection that extends from the engine to the power-conversion device;
    a continuously variable power source in communication with the power-conversion device via an intermediate power-transfer connection;
    a lock-up device including a clutch assembly and a gear located between the power-conversion device and the continuously variable power source, the lock-up device having first and second engagement states; and
    a power-output connection;
    wherein, with the lock-up device in the first engagement state, the power-conversion device receives mechanical power from the engine via the direct mechanical power-transfer connection and converts the received mechanical power to a non-mechanical form, the continuously variable power source receives the non-mechanical power from the power-conversion device via the intermediate power-transfer connection and converts the received non-mechanical power to mechanical power, and the continuously variable power source transmits the mechanical power to the power-output connection via the clutch assembly and the gear; and
    wherein, with the lock-up device in the second engagement state, the engine transmits mechanical power through the clutch assembly and the gear to the power-output connection.

2. The multi-mode power train of claim 1, wherein the power-conversion device includes a hydraulic pump, and the continuously variable power source includes a hydraulic motor.

3. The multi-mode power train of claim 1, wherein the power-conversion device includes an electric generator, and the continuously variable power source includes a electric motor.

4. The multi-mode power train of claim 1, wherein the engine, the power-conversion device, the lock-up device, and the continuously variable power source are arranged in series.

5. The multi-mode power train of claim 1, further comprising:
    an energy storage device in communication with the continuously variable power source and the power-conversion device;
    wherein, in a first mode the energy storage device receives energy for storage from at least one of the power-conversion device and the continuously variable power source; and
    wherein, in a second mode, the energy storage device provides stored energy from the energy storage device to the continuously variable power source.

6. A work vehicle for operation in multiple powered modes, the work vehicle comprising:
    an engine;
    a power-conversion device in communication with the engine via a direct mechanical power-transfer connection that extends from the engine to the power-conversion device;
    a continuously variable power source in communication with the power-conversion device via an intermediate power-transfer connection;
    a lock-up device including a clutch assembly and a gear located between the power-conversion device and the continuously variable power source, the lock-up device having first and second engagement states; and
    a power-output connection;
    wherein, with the lock-up device in the first engagement state, the power-conversion device receives mechanical power from the engine via the direct mechanical power-transfer connection and converts the received mechanical power to a non-mechanical form, the continuously variable power source receives the non-mechanical power from the power-conversion device via the intermediate power-transfer connection and converts the received non-mechanical power to mechanical power, and the continuously variable power source transmits the mechanical power to the power-output connection via the clutch assembly and the gear; and
    wherein, with the lock-up device in the second engagement state, the engine transmits mechanical power through the clutch assembly and the gear to the power-output connection.

7. The work vehicle of claim 6, wherein the power-conversion device includes a hydraulic pump, and the continuously variable power source includes a hydraulic motor.

8. The work vehicle of claim 6, wherein the power-conversion device includes an electric generator, and the continuously variable power source includes a electric motor.

9. The work vehicle of claim 6, wherein the engine, the power-conversion device, the lock-up device, and the continuously variable power source are arranged in series.

10. The work vehicle of claim 6, further comprising:
an energy storage device in communication with the continuously variable power source and the power-conversion device;
wherein, in a first mode the energy storage device receives energy for storage from at least one of the power-conversion device and the continuously variable power source; and
wherein, in a second mode, the energy storage device provides stored energy from the energy storage device to the continuously variable power source.

* * * * *